No. 690,552. Patented Jan. 7, 1902.
M. A. BECK.
AUTOMATIC BRAKE.
(Application filed July 30, 1900.)
(No Model.)

Witnesses:
Geo. W. Young,
Chas. L. Goss.

Inventor:
Matthias A. Beck,

United States Patent Office.

MATTHIAS A. BECK, OF MILWAUKEE, WISCONSIN, ASSIGNOR TO PAWLING AND HARNISCHFEGER, A FIRM COMPOSED OF ALONZO PAWLING AND HENRY HARNISCHFEGER, OF MILWAUKEE, WISCONSIN.

AUTOMATIC BRAKE.

SPECIFICATION forming part of Letters Patent No. 690,552, dated January 7, 1902.

Application filed July 30, 1900. Serial No. 25,239. (No model.)

*To all whom it may concern:*

Be it known that I, MATTHIAS A. BECK, a citizen of the United States, residing at Milwaukee, in the county of Milwaukee and State of Wisconsin, have invented certain new and useful Improvements in Automatic Brakes, of which the following is a specification, reference being had to the accompanying drawings, forming a part thereof.

This invention relates particularly to hoisting-machines; and its object is to automatically control with certainty and precision the descent of the load by the operation of the motor.

It consists in certain novel features of construction and arrangement of parts hereinafter particularly described, and pointed out in the claims.

In the accompanying drawings like letters designate the same parts in the several figures.

Figure 1:
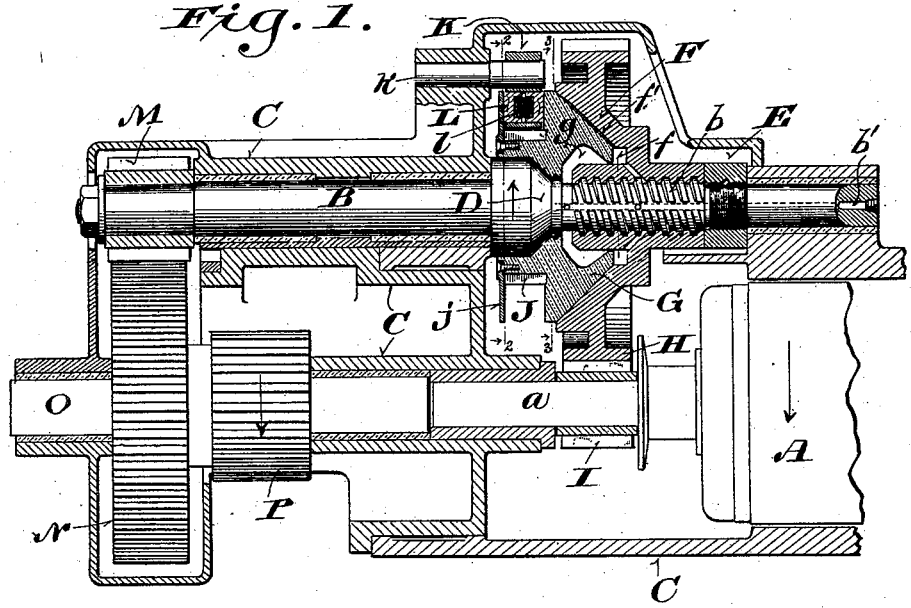
Figure 2:
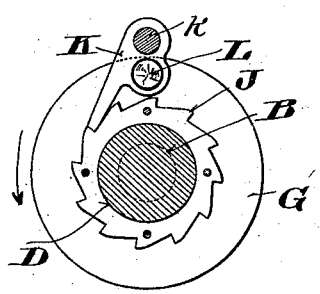
Figure 3:
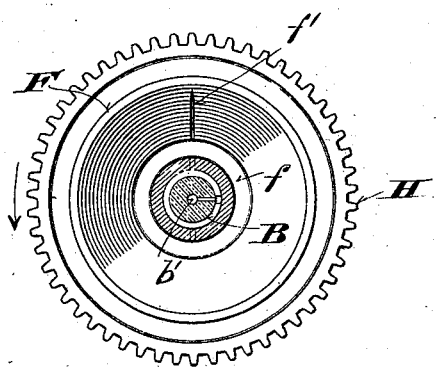

Figure 1 is a vertical longitudinal section of the brake as constructed and arranged for use in connection with an electric motor and hoisting-drum. Fig. 2 is a vertical cross-section on the line 2 2, Fig. 1; and Fig. 3 is a like section on the line 3 3, Fig. 1.

A designates the armature of an electric motor, a portion of which is shown in Fig. 1.

B is the brake-shaft, supported in suitable bearings in the frame C, parallel with the armature-shaft. It is formed with a screw-thread $b$ and provided at or near the ends of the screw-thread with collars D and E, forming shoulders or abutments for limiting the separation of the brake members and retaining them in place on the shaft B. The collar D is preferably formed integrally with the shaft B and is made cone-shaped or tapering on the end toward the collar E, which is made separate from and adjustable upon said shaft to provide for assembling the parts and to limit the separation of one friction-wheel or brake member from the other, particularly in unwinding the chain or cable from the hoisting-drum without a load.

F and G are friction-wheels constituting the engaging members of the brake. They are loosely mounted upon the shaft B between the collars D and E and are formed with cone-shaped or tapering faces fitting one into the other. The hub or bore of the female friction-wheel F is screw-threaded to engage with the screw-thread on the shaft B and is formed or provided with a gear H, which meshes with a gear or pinion I on the shaft $a$ of the armature A. The male friction-wheel G is formed with a conical or tapering recess fitting the conical or tapering collar D. It is also formed or provided with a ratchet-wheel J, to the outer end of which a flange $j$ is attached.

K is a pawl pivoted to the frame C by a pin $k$ in position to engage with the ratchet-wheel J and prevent it from turning in one direction with the shaft B. It is formed with a transverse socket or hole, in which are loosely fitted two recessed friction-blocks L. Between these blocks is interposed a spring $l$, tending to force them outwardly against the opposing annular faces on the friction-wheel G and the flange $j$.

As shown in Fig. 1 of the drawings, the brake-shaft B is provided with a gear or pinion M, meshing with a gear N on a shaft O, which is supported in line with the armature-shaft $a$ by bearings provided therefor in frame C.

The shaft O is provided with a pinion P, intended to mesh with and drive a large gear on the hoisting-drum, which is not shown. The construction and arrangement of the connections of the brake with the motor and hoisting-drum may, however, be reversed and variously modified without changing the principle of the brake or materially affecting its mode of operation.

To provide for thorough lubrication of the working parts of the brake, the shaft B is formed through one end with a passage $b'$, which communicates with the bore or hub of the friction-wheel F and with the recess $g$ in the inner end of the friction-wheel G through lateral openings or branch passages, as shown in Figs. 1 and 3. Passages are also formed through the hub of the friction-wheel F from its bore into an annular groove or recess $f$ in its working face. A radiating groove $f'$ is also formed in the conical face of the friction-wheel F to allow the lubricant to flow more freely between the engaging faces of the friction-wheels and to more thoroughly lubricate them. An oil or grease cup (not shown) is screwed into the outer end of the passage b'.

My improved brake operates as follows: To elevate the load, the motor and the driving connections between it and the hoisting-drum are turned in directions indicated by arrows on the drawings. The friction-wheel F is thus turned on the screw b against the friction-wheel G, which is at the same time forced by the friction-wheel F against the collar D, thereby locking both brake members together fast upon the shaft B, which is compelled to turn with the gear H and communicate motion to the hoisting-drum through the shaft O and gears M, N, and P in the direction required to raise the load. To lower the load, the motor and the driving connections between it and the hoisting-drum are turned in directions reverse to those indicated by the arrows, thereby tending to carry the friction-wheel F on the screw b away from the friction-wheel G and to separate their engaging faces or to reduce the frictional engagement between them. When the friction-wheel F is turned backward or in a direction opposite to that indicated by the arrow on Fig. 3, the friction-wheel G is prevented from turning with the shaft B by the engagement of the pawl K with the ratchet-wheel J. The working face of the friction-wheel F is thus caused to slip on the opposing face of the friction-wheel G. The load which tends to turn the shaft B in the direction opposite that in which it is turned by the motor when the load is being raised also tends to force the friction-wheel F on the screw b against the friction-wheel G, so that when the movement of the gear H and connected friction-wheel F is arrested by stopping the motor the gear F will be instantly forced by the screw b into fast engagement with the friction-wheel G, which is held from turning by the pawl K and ratchet-wheel J. The descent of the load is thus automatically and positively governed by the operation of the motor and instantly arrested when the motor is stopped. The annular bearing-faces on the outer end of the friction-wheel G and on the flange j acting on the friction-blocks L carry the pawl K out of range with the teeth of said ratchet-wheel, thereby preventing unnecessary noise and wear when the friction-wheel G is turned in the direction indicated by the arrow on Fig. 2. When said friction-wheel G starts to turn in the opposite direction, said friction-faces act with said blocks to instantly throw said pawl into engagement with said ratchet-wheel, and thus prevent further turning of the friction-wheel G in that direction. The conical or tapering collar D and the corresponding recess in the friction-wheel G take up play and hold said friction-wheel centrally and truly on the shaft B, and the conical or tapering face of the friction-wheel G fitting into the opposing face of the friction-wheel F centers the latter with its gear H on the shaft B, prevents wabbling of said gear, and causes it to run truly and work evenly and properly with the pinion I without unequal wear and needless noise.

Various changes in minor details of the brake and in its connections with the mechanism it is intended to govern may be made without departing from the principle and intended scope of my invention.

I claim—

1. In an automatic brake, the combination with a rotary power-transmitting shaft having a screw-thread and a conical or tapering shoulder, of two friction-wheels loosely mounted on said shaft and having conical or tapering engaging faces, one of said friction-wheels having a screw-threaded bore engaging the screw-thread on said shaft, and the other friction-wheel having a conical or tapering recess fitting the conical or tapering shoulder on said shaft, and means for holding the last-mentioned friction-wheel from turning in one direction, substantially as and for the purposes set forth.

2. In an automatic brake, the combination of a shaft having two collars and a screw-thread between them, one of said collars having a conical end, of male and female conical friction-wheels loosely mounted on said shaft between said collars, the male friction-wheel having a central conical recess next to and fitting the conical collar and the female friction-wheel having its hub screw-threaded to engage the screw-thread on said shaft and extending into a recess in the adjacent end of the male friction-wheel, and means for holding the male friction-wheel from turning in one direction, substantially as described.

3. In an automatic brake, the combination with a rotary power-transmitting shaft having two collars and a screw-thread between them, of friction-wheels loosely mounted on said shaft between said collars, the hub of one of said wheels being screw-threaded to engage the screw-thread on said shaft, and means for preventing the other friction-wheel from turning in one direction, one of said friction-wheels having an internal recess for holding a lubricant in communication with the working faces of said wheels, substantially as described.

4. In an automatic brake, the combination with a shaft having two collars and a screw-thread between them, of male and female conical friction-wheels loosely mounted upon said shaft between said collars, the male friction-wheel having a central recess in one end and the female friction-wheel having a hub extending into said recess and screw-threaded to engage the screw-thread on said shaft, means for holding the male friction-wheel from turning in one direction, and means for supplying lubricant to the recess therein, substantially as described.

5. In an automatic brake, the combination with a shaft having two collars and a screw-thread between them, of male and female conical friction-wheels loosely mounted on said shaft between said collars, the male friction-wheel having a lubricant-holding recess opening through its inner end next to its working face, the female friction-wheel having its hub internally screw-threaded to engage the screw-thread on said shaft and an annular lubricant-recess around its hub next to its working face, and said shaft having a passage leading into said recess for supplying lubricant thereto, and means for holding the male friction-wheel from turning in one direction, substantially as described.

In witness whereof I hereto affix my signature in presence of two witnesses.

MATTHIAS A. BECK.

Witnesses:
HERBERT L. ROLOFF,
CHAS. L. GOSS.